(12) United States Patent
Tsai et al.

(10) Patent No.: US 8,402,178 B2
(45) Date of Patent: *Mar. 19, 2013

(54) DEVICE TO DEVICE FLOW CONTROL WITHIN A CHAIN OF DEVICES

(75) Inventors: Victor Y. Tsai, Palo Alto, CA (US); William H. Radke, Los Gatos, CA (US); Peter Feeley, Boise, ID (US); Neal A. Galbo, Boca Raton, FL (US); Robert N. Leibowitz, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/455,645

(22) Filed: Apr. 25, 2012

(65) Prior Publication Data

US 2012/0210025 A1 Aug. 16, 2012

Related U.S. Application Data

(63) Continuation of application No. 12/550,770, filed on Aug. 31, 2009, now Pat. No. 8,209,447.

(51) Int. Cl.
*G06F 15/16* (2006.01)
*G06F 3/00* (2006.01)

(52) U.S. Cl. ............... 710/29; 709/232; 709/233
(58) Field of Classification Search .............. None
See application file for complete search history.

(56) References Cited

U.S. PATENT DOCUMENTS

| | | |
|---|---|---|
| 5,528,591 A | 6/1996 | Lauer |
| 5,748,629 A | 5/1998 | Caldara et al. |
| 6,249,819 B1 | 6/2001 | Hunt et al. |
| 6,928,501 B2 | 8/2005 | Andreas et al. |
| 7,006,440 B2 | 2/2006 | Agrawal et al. |
| 7,430,622 B1 | 9/2008 | Owen |
| 7,698,478 B2 | 4/2010 | Wang et al. |
| 2007/0189166 A1 | 8/2007 | Johnson et al. |

*Primary Examiner* — Idriss N Alrobaye
*Assistant Examiner* — Richard B Franklin
(74) *Attorney, Agent, or Firm* — Brooks, Cameron & Huebsch, PLLC (57) ABSTRACT

The present disclosure includes methods, devices, and systems for device to device flow control. In one or more embodiments, a system configured for device to device flow control includes a host and a chain of devices, including one or more memory device, coupled to each other and configured to communicate with the host device through a same host port. In one or more embodiments, at least one device in the chain is configured to regulate the flow of data by sending a token in downstream data packets, the token allowing devices downstream from the respective at least one device to send an upstream data packet to the respective at least one device.

20 Claims, 4 Drawing Sheets

DEVICE TO DEVICE FLOW CONTROL WITHIN A CHAIN OF DEVICES

PRIORITY APPLICATION INFORMATION

This application is a Continuation of U.S. application Ser. No. 12/550,770, filed Aug. 31, 2009, the specification of which is incorporated herein by reference.

TECHNICAL FIELD

The present disclosure relates generally to memory devices, methods, and systems, and more particularly, to device to device flow control.

BACKGROUND

Peripheral devices, such as memory devices, are frequently coupled to a single host, such as a computer. Memory devices are typically provided as internal, semiconductor, integrated circuits in various electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored information when not powered and can include NAND flash memory, NOR flash memory, read only memory (ROM), Electrically Erasable Programmable ROM (EEPROM), Erasable Programmable ROM (EPROM), and phase change random access memory (PCRAM), among others.

Examples of other peripheral devices include, but are not limited to, printers, scanners, cameras, wireless communication peripherals such as Bluetooth or WiFi devices, external hard drives, etc. One configuration for coupling multiple peripheral devices (e.g., memory and non-memory devices) includes a radial arrangement. Radial configurations have a number of drawbacks, such as increased pin counts required to attach all the peripheral devices. Other multi-drop or multi-bus configurations have been proposed; however, problems exist with these configurations, such as bus contention among connected devices, and unacceptable signal integrity.

Inefficient data flow between and among multiple devices coupled to a host can lead to collisions and/or logjams, which can lead to inefficient bandwidth allocation, among various other problems, in such electronic systems.

DETAILED DESCRIPTION

The present disclosure includes methods, devices, and systems for device to device flow control. In one or more embodiments, a system configured for device to device flow control includes a host and a chain of devices, including one or more memory device, coupled to each other and configured to communicate with the host device through a same host port. In one or more embodiments, at least one device in the chain is configured to regulate the flow of data by sending a token in downstream data packets, the token allowing devices downstream from the respective at least one device to send an upstream data packet to the respective at least one device.

Embodiments of the present disclosure can control and arbitrate priority of data flow among chained devices in communication with the same interface port of a host, for example. Embodiments can ensure well-regulated upstream data flow, which can provide various benefits such as avoiding collisions and logjams while ensuring suitable bandwidth allocation to upstream data flow throughout the chain.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designator "N," particularly with respect to reference numerals in the drawings, indicates that a number of the particular feature so designated can be included with one or more embodiments of the present disclosure. The designator can represent the same or different numbers of the particular features.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure, and should not be taken in a limiting sense.

Figure 1:
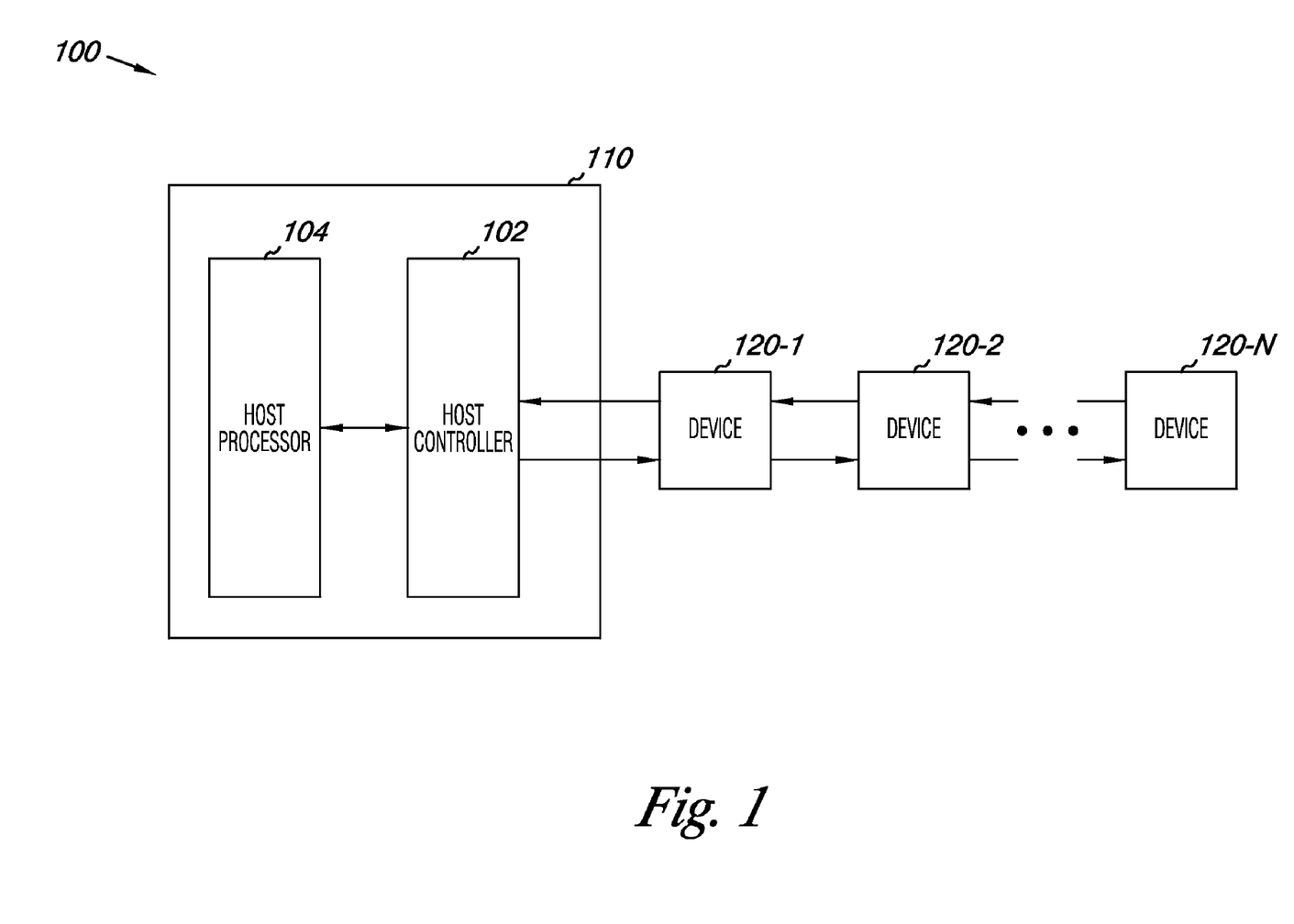
FIG. 1 is a functional block diagram of a system for device to device flow control in accordance with one or more embodiments of the present disclosure.

FIG. 1 is a functional block diagram of an electronic system 100 for device to device flow control in accordance with one or more embodiments of the present disclosure. The embodiment illustrated in FIG. 1 includes a host 110. The host 110 can be a computing device, such as a personal computer, among various other computing devices. For instance, host 110 can be a laptop computer, personal computer, mobile phone, digital camera, digital recording and play back device, PDA, memory card reader, or interface hub, among other examples. In one or more embodiments, the host 110 can be a network device (e.g., a router) that can include hardware and/or software for routing and forwarding information (e.g., data packets).

In the embodiment illustrated in FIG. 1, the host 110 includes a host controller 102 and a host processor 104, among other host elements not shown. In one or more embodiments, the host controller 102 can be used to communicate information with a number of chained devices (e.g., devices 120-1, 120-2, . . . , 120-N) and another device (e.g., host system 110).

The chain of devices 120-1, 120-2, ..., 120-N can include memory and/or non-memory peripheral devices. For example, in various embodiments, one or more of the chained devices 120-1, 120-2, ..., 120-N can be a DRAM or Flash memory device (e.g., NOR and/or NAND Flash memory device). One or more of the chained peripheral devices 120-1, 120-2, ..., 120-N can include a printer, scanner, camera, or a wireless communication peripheral (e.g., a Bluetooth or WiFi device), among various other peripheral device types.

As used herein, in one or more embodiments, "chained" peripheral devices (e.g., 120-1, 120-2, ..., 120-N) can refer to devices communicatively coupled to a host device (e.g., host system 110) via the same interface port of a host device (e.g., via the same interface port of host processor 104). A particular host interface port can include a data input port and a data output port. As such, data can be communicated between the host system 110 and the chained devices 120-1, 120-2, ..., 120-N via the same single interface port of the host 110.

Coupling peripheral devices to a single data output port and a single data input port of the host device can reduce the number of pins needed on a host (e.g., host 110), which can decrease device cost and simplify production, among other benefits. As used herein, the term single data port is used to indicate a single serial connection to a host for multiple peripheral devices, in contrast to a parallel connection in which each peripheral device is separately coupled to a host.

In one or more embodiments, chaining peripheral devices to a host, such as illustrated in FIG. 1, allows for point to point signaling. Such chained configurations can be arbitrarily long and can provide benefits such as reducing the use of complex addressing circuitry, among other benefits. As discussed above, embodiments of the present disclosure can include various configurations for the peripheral devices 120-1, 120-2, ..., 120-N (e.g., various combinations of memory and non-memory devices).

In one or more embodiments, and as described below, the devices 120-1, 120-2, ..., 120-N can include control circuitry (not shown in FIG. 1) such as one or more device controllers that can be used to facilitate operations, such as read, write, and/or erase operations for memory devices, among other operations, that are communicated to the devices 120-1, 120-2, ..., 120-N from the host 110.

In one or more embodiments, and as described in detail below in connection with FIGS. 2-4, one or more of the devices (e.g., 120-1, 120-2, ..., 120-N) can be configured to regulate the flow of upstream data by sending (e.g., passing or forwarding) a token in downstream data packets. For instance, in various embodiments, a respective device (e.g., device 120-1) is configured to control the flow of upstream data by sending tokens in downstream data packets. In one or more embodiments, the token allows devices downstream from the respective device to send an upstream data packet to the respective device.

For example, the token can provide an indication to devices downstream from the respective device (e.g., devices 120-2 through 120-N) that the respective device 120-1 is ready to receive an upstream data packet (e.g., that an input buffer of the device 120-1 is available). In one or more embodiments, the one or more devices downstream from the respective device in the chain are configured to send data to the respective device only when they have received a downstream data packet containing the token. In various embodiments, the token in a particular downstream data packet is consumed when a device downstream from the respective device sends an upstream data packet. That is, the token can be consumed by a downstream device, which can allow the downstream device to send an upstream data packet, for example.

As described further below, in one or more embodiments, a token is valid for transmission of only one upstream data packet by a device downstream from the respective device to the respective device. The respective device (e.g., 120-1), can be configured to apply a data alternation rule that determines an amount of a total output bandwidth of the respective device allocated to upstream data from downstream devices of the chain. In one or more embodiments, the data alternation rule applied by the respective device (e.g., 120-1) includes allocating about one half of the total output bandwidth of the respective device to upstream data from downstream devices of the chain (e.g., devices 120-2 through 120-N).

Figure 2:
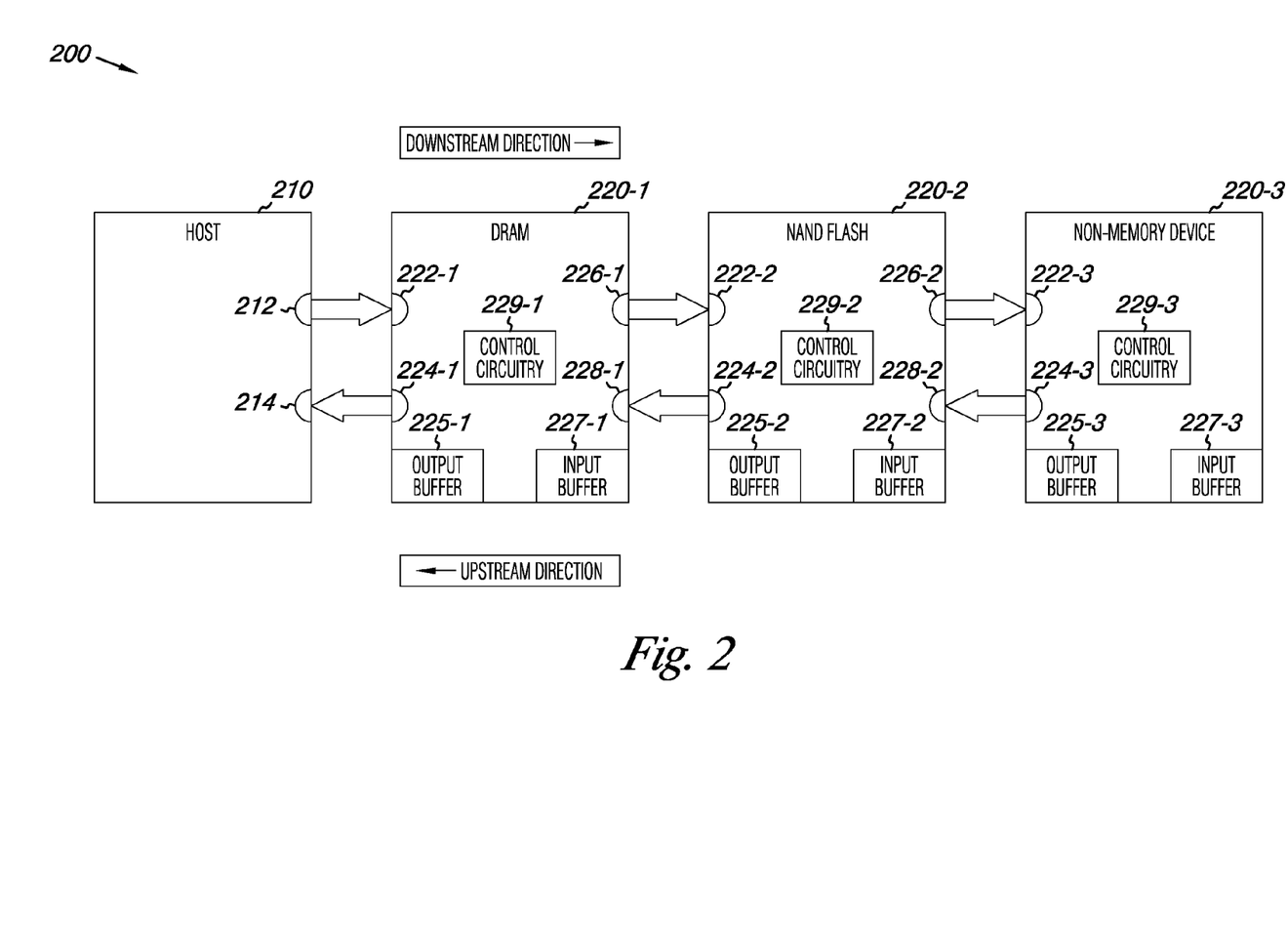
FIG. 2 is a functional block diagram of a system for device to device flow control in accordance with one or more embodiments of the present disclosure.

FIG. 2 is a functional block diagram of an electronic system 200 for device to device flow control in accordance with one or more embodiments of the present disclosure. The system 200 can be a system such as system 100 described above in connection with FIG. 1. In the embodiment illustrated in FIG. 2, the system 200 includes a host 210, a first device 220-1, a second device 220-2, and a third device 220-3. In this example, the first device 220-1 is a DRAM device, the second device 220-2 is a NAND Flash memory device, and the third device 220-3 is a non-memory peripheral device such as a printer, scanner, or camera, among other types of non-memory peripheral devices.

In one or more embodiments, and as shown in FIG. 2, the peripheral devices 220-1, 220-2, and 220-3 are connected in a chained topology such that each communicate with the host 210 via the same host data output port 212 and host data input port 214. In the embodiment illustrated in FIG. 2, the first device 220-1 includes an upstream data input port 222-1, an upstream data output port 224-1, a downstream data output port 226-1, and a downstream data input port 228-1. The second device 220-2 includes an upstream data input port 222-2, an upstream data output port 224-2, a downstream data output port 226-2, and a downstream data input port 228-2. The third device 220-3 includes an upstream data input port 222-3, an upstream data output port 224-3. In the embodiment illustrated in FIG. 2, the arrows between the devices 210, 220-1, 220-2, and 220-3 represent upstream and downstream data flows.

As used herein, an upstream data port refers to a data port through which data is sent to and/or received by a device upstream (e.g., in the upstream direction from a particular device). Also, a downstream data port refers to a data port through which data is sent to and/or received by a device downstream (e.g., in the downstream direction from the particular device).

As an example, one or more data packets can be sent downstream from the host 210 via host data output port 212 and received by the upstream data input port 222-1 of the first device 220-1. The first device 220-1 can operate on the data packet (e.g., if the data packet is destined for the first device) or can send the data packet on (e.g., via downstream data output port 226-1) to a downstream device in the chain (e.g., to upstream data input port 222-2 of the second device 220-2).

Similarly, data packets can be sent upstream from one or more of the devices 220-1, 220-2, and 220-3 toward the host 210. For example, upstream data packets destined for the host 210 can be sent from the second device 220-2 or third device 220-3 and received by the first downstream device 220-1 via downstream data input port 228-1. The upstream data packet can then be sent on to host data input port 214 of the host 210 by the first device 220-1 via upstream data output port 224-1.

As used herein, a data packet can refer to a packet that contains data and/or commands such as address assignments, requests for data, etc.

In the embodiment illustrated in FIG. 2, the downstream peripheral devices 220-1, 220-2, and 220-3 each include respective control circuitry 229-1, 229-2, and 229-3, as well as a respective input buffer 225-1, 225-2, and 225-3 and a respective output buffer 227-1, 227-2, and 227-3. The input buffers 227-1, 227-2, and 227-3 can stage (e.g., hold) data received from one or more devices downstream (e.g., upstream data packets received via respective downstream input data port 228-1, 228-2, and 228-3). The output buffers 225-1, 225-2, and 225-3 can be filled with data generated locally by a particular device and with data staged (e.g., held) in a respective input buffer 227-1, 227-2, and 227-3.

In chained topologies such as that illustrated in FIG. 2, it can be difficult to regulate upstream data flows by using the host (e.g., 210). For instance, the host may not be able to directly regulate data flows in the upstream direction because each of the downstream devices in the chain (e.g., 220-1, 220-2, and 220-3) may have data ready to be transmitted upstream at arbitrary times. The data to be transmitted upstream by the downstream peripheral devices 220-1, 220-2, and 220-3 can be generated by the devices themselves (e.g., in response to a command received from the host 210) and/or can be received from one or more other downstream devices and/or from external sources such as radio signals, for example.

One or more embodiments of the present disclosure can ensure well-regulated upstream data flow which can provide various benefits such as avoiding collisions and logjams while ensuring suitable bandwidth allocation to upstream data flow throughout the chain. For instance, one or more embodiments include sending a data packet from a host (e.g., 210) to a first device (e.g., 220-1) in a chain of devices including one or more memory devices.

In various embodiments, data packets sent downstream from the host 210 to one or more downstream devices 220-1, 220-2, and 220-3 can include a token. The token can be located at a particular location in a downstream data packet. For instance, in various embodiments, the token can be located in the header portion of a downstream data packet. The token can be one or more data bits or pattern of bits inserted into downstream data packet and can be used to indicate to downstream devices (e.g., 220-1, 220-2, and 220-3) that an upstream device is ready to receive an upstream data packet.

For instance, one or more embodiments can include sending the downstream data packet from the first device 220-1 to the second downstream device 220-2 in the chain only if the first device 220-1 is ready to receive an upstream data packet. That is, the control circuitry 229-1 of device 220-1 can be configured to regulate the flow of upstream data by sending a token in downstream data packets, which allows devices downstream from the first device 220-1 to send an upstream data packet to the first device 220-1. As such, in various embodiments, the token can be used to prevent a downstream device (e.g., 220-2) from sending an upstream data packet until the upstream device (e.g., 220-1 in this example) is ready.

The second device 220-2 can detect the token in the downstream data packet and can determine whether to send an upstream data packet to the first device or to send the data packet containing the token to a third device (e.g., 220-3) in the chain. As described further in connection with FIGS. 3 and 4, the determination of whether to send an upstream data packet (e.g., whether to consume the token) can be based on a data alternation rule.

In the example shown in FIG. 2, one of the second and third devices (220-2 and 220-3) can consume the token in the downstream data packet received from the first device 220-1. In one or more embodiments, consuming the token allows the consuming downstream device to send an upstream data packet to the first device 220-1. As noted above, in various embodiments, a downstream device is allowed to send only one upstream data packet for each token consumed. For example, if the second device 220-2 consumes the token in a downstream data packet, then the second device 220-2 can send one upstream data packet, in one or more embodiments. Embodiments are not limited to this example.

In one or more embodiments, a device downstream from the first device 220-1 can consume the token in a downstream data packet without operating on the downstream data packet. As an example, consider a downstream data packet from the host 210 which contains a command destined for a target device (e.g., the third device 220-3) along with a token. The downstream data packet can be sent by the first device 220-1 to one or more intermediary devices (e.g., the second device 220-2) when the first device 220-1 determines it is ready to receive an upstream data packet. The second device 220-2 can detect the token in the downstream data packet and can determine that the data packet is to be sent to the third device 220-3. Prior to sending the downstream data packet to the third device 220-3, the second device 220-2 can determine whether to consume the token. If the second device 220-2 consumes the token, then the second device can send an upstream data packet to the first upstream device 220-1 and send the now tokenless downstream data packet on to device 220-3. If the second device 220-2 does not consume the token, then the downstream data packet (including the token) is sent to the third device 220-3, which can then detect the token and consume it in order to send an upstream data packet. In this example, whether the second device 220-2 consumes the token or not can be determined by a data alternation rule. For instance, in this example, the second device 220-2 can be configured to employ a data alternation rule such that every other token it receives is sent to a downstream device (e.g., 220-3). In this manner, half of the output buffer 225-2 can contain data received from devices downstream of device 220-2 and half of the output buffer can contain data generated locally by device 220-2 (e.g., 50% of the output bandwidth of device 220-2 can be allocated to data received from device 220-3).

In one or more embodiments, the first device 220-1 can be configured to generate a data packet containing the token and send the data packet downstream when the first device 220-1 is ready to receive an upstream data packet and there is an absence of downstream data traffic from the host 210. For example, if the input buffer 227-1 of the first device 220-1 is available to receive upstream data but there is a lack of downstream data packets from the host 210, then the device 220-1 can generate a downstream data packet that contains a token and send the data packet downstream such that one of the downstream devices 220-2 and 220-3 can consume the token and thereby send an upstream data packet to the input buffer 227-1 of device 220-1.

In one or more embodiments, a downstream device (e.g., 220-1, 220-2, 220-3) can be configured to insert a token into a downstream data packet. As an example, consider a tokenless downstream data packet destined for the third downstream device 220-3, which is received by the second downstream device 220-2 from the first downstream device 220-1.

The second downstream device 220-2 can insert a token into the downstream data packet as the packet is routed through. For instance, the second downstream device 220-2 can determine that there is sufficient buffer space available for it to receive an upstream data packet (e.g., from the downstream device 220-3). As such, the second downstream device 220-2 can receive upstream data packets, despite the lack of a token in the downstream data packet received from the first downstream device 220-1. The ability of downstream devices (e.g., 220-1, 220-2, 220-3) to insert tokens into downstream data packets, to consume tokens, and to generate downstream data packets having tokens has various benefits. For example, the ability of the second downstream device 220-2 to insert a token into a tokenless downstream data packet and to generate downstream data packets destined for a downstream device (e.g., 220-3), can give the second downstream device 220-2 effective control of the data flow of the third downstream device 220-3, independent of the status of, or commands from, an upstream device (e.g., host 210 or device 220-1). As such, in one or more embodiments, the control of each downstream device can be independent.

Embodiments of the present disclosure are not limited to the examples illustrated in or described in connection with FIG. 2. For instance, although three peripheral devices 220-1, 220-2, and 220-3 are shown in the system 200, embodiments can include a greater or lesser number of chained peripheral devices. One of ordinary skill in the art will appreciate that the system 200 can include additional circuitry not shown in FIG. 2.

Figure 3:
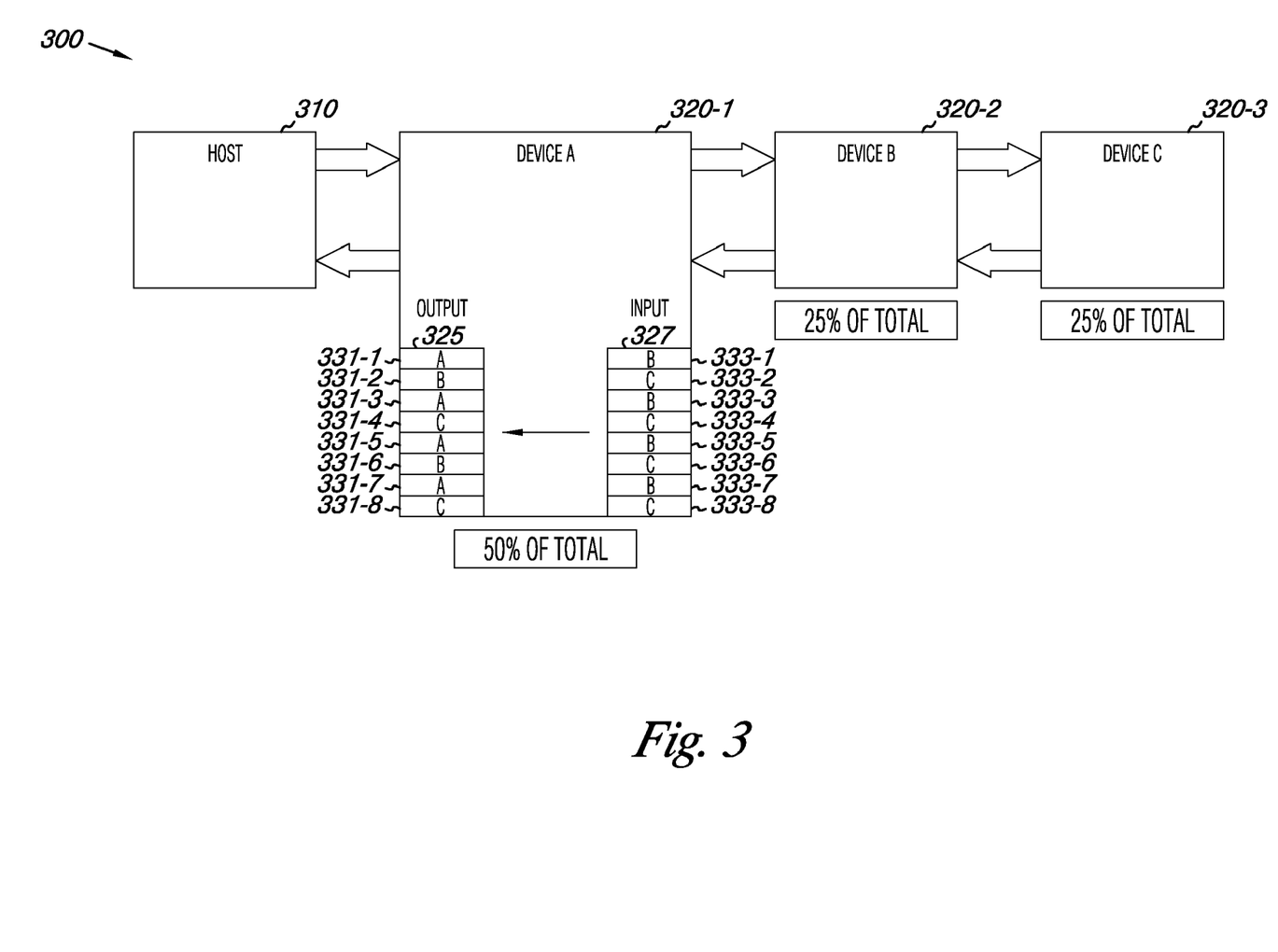
FIG. 3 is a functional block diagram of a system for device to device flow control in accordance with one or more embodiments of the present disclosure.

FIG. 3 is a functional block diagram of an electronic system 300 for device to device flow control in accordance with one or more embodiments of the present disclosure. The system 300 can be a system such as system 200 described in FIG. 1 and system 100 described in FIG. 1. In the embodiment illustrated in FIG. 3, the system 300 includes a number of peripheral devices 320-1 (DEVICE A), 320-2 (DEVICE B), and 320-3 (DEVICE C) connected in a chained topology to a host 310. As such, the devices 320-1, 320-2, and 320-3 can communicate with the host 310 via the same host interface port.

As described above, the devices 320-1, 320-2, and 320-3 can be various types of peripheral devices including both memory and non-memory devices. Although three peripheral devices are shown in the system 300 illustrated in FIG. 3, embodiments are not limited to a particular number of chained devices.

FIG. 3 illustrates an example of bandwidth allocation and flow control according to one or more embodiments of the present disclosure. As described above in connection with FIGS. 1 and 2, in various embodiments, a token can be included in downstream data packets from a host (e.g., 310). The token can be detected by a device (e.g., 320-1, 320-2, and 320-3), which can then either send an upstream data packet (thereby consuming the token) or can send the data packet having the token to a device further downstream in the chain.

In the embodiment illustrated in FIG. 3, the first device 320-1 is configured to employ a particular data alternation rule for allocating at least a portion of its total output bandwidth to downstream devices (e.g., devices 320-2 and 320-3 in this example). In this example, device 320-1 is configured to fill its output buffer 325 in an alternating manner with data generated locally by device 320-1 and data received from downstream devices (e.g., data staged in input buffer 327). If there is no data staged in the input buffer 327, the device 320-1 can continue to fill the output buffer with locally generated data.

As shown in the embodiment illustrated in FIG. 3, the first device 320-1 is configured to allocate 50% of its total output bandwidth to data received from downstream devices (e.g., 320-2 and 320-3) and 50% of its output bandwidth to data generated locally by device 320-1. For instance, in this example, the device 320-1 is configured to fill the output buffer 325 alternatively with one data packet from the input buffer 327 and one locally generated data packet. Similarly, in this example, the second device 320-2 is configured to allocate 50% of its output bandwidth to data received from downstream devices (e.g., device 320-3 in this example) and 50% to data generated locally by device 320-2. In this manner, 25% of the total output bandwidth of the first device 320-1 is allocated to the second device 320-2 and 25% of the total output bandwidth of the first device 320-1 is allocated to the third device 320-3.

FIG. 3 illustrates the allocation of bandwidth described in the example above. For instance, the output buffer 325 of the first device 320-1 is filled, in an alternating fashion with upstream data packets generated locally (e.g., data packets 331-1, 331-3, 331-5, and 331-7) and with upstream data packets from the input buffer 327 (e.g., data packets 331-2, 331-4, 331-6, and 331-8 received from downstream devices 320-2 and 320-3 and staged in the input buffer 327). In this example, the input buffer 327 is filled in an alternating fashion with upstream data packets from the second device 320-2 (e.g., data packets 333-1, 333-3, 333-5, and 333-7) and with upstream data packets from the third device 320-3 (e.g., data packets 333-2, 333-4, 333-6, and 333-8).

To accomplish the data allocation illustrated in FIG. 3, the device 320-1 can be configured to consume half the tokens it detects in downstream data packets received from the host 310, while sending half of the received tokens to downstream devices 320-2 and 320-3. Similarly, the device 320-2 can be configured to consume half the tokens it detects in downstream data packets received from the first downstream device 320-1, while sending half of the received tokens to downstream device 320-3.

In this manner, the first device 320-1 can regulate the flow of upstream data from peripheral devices (e.g., 320-2 and 320-3) further downstream in the chain. Using the first device in a chain of peripheral devices to regulate upstream data flow in this manner can provide benefits such as improved bandwidth since a host (e.g., 310) may not be able to adequately monitor and regulate upstream data flows in the chain of devices. Although, in the embodiment illustrated in FIG. 3, the downstream devices 320-1, 320-2, and 320-3 are configured to send only one upstream data packet for each token received, embodiments are not so limited. For instance, in some embodiments, downstream devices can be configured to send multiple (e.g., two, three, etc.) upstream data packets for each token consumed.

In one or more embodiments, the first device 320-1 can be a memory device 320-1 (e.g., a DRAM device or Flash memory device). In various embodiments, the memory device 320-1 can include control circuitry (e.g., control circuitry 229-1 shown in FIG. 2) configured to control the flow of upstream data packets received from downstream devices in the chain (e.g., 320-2 and 320-3) by inserting a token into a downstream data packet from the host 310 and sending through the memory device 320-1 when the input buffer 327 is ready to receive an upstream data packet from one of the downstream devices 320-2 and 320-3.

Figure 4:
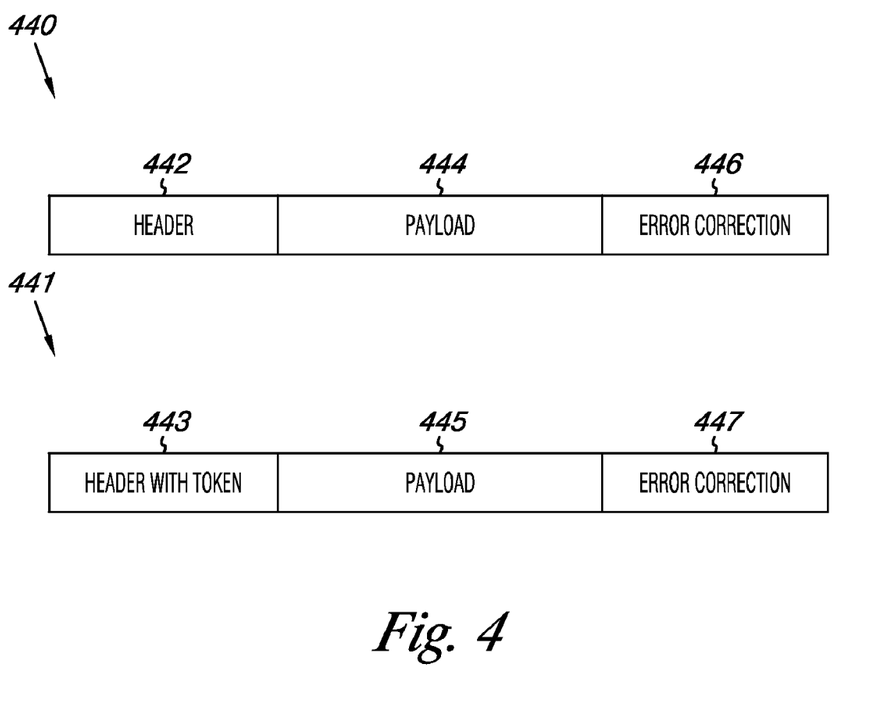
FIG. 4 illustrates example data packets that can be used for device to device flow control in accordance with one or more embodiments of the present disclosure.

FIG. 4 illustrates example data packets 440 and 441 that can be used for device to device flow control in accordance with one or more embodiments of the present disclosure. As illustrated in FIG. 4, the data packet 440 includes a header portion 442, a payload portion 444, and an error correction portion 446. The data packet 440 can be an upstream data packet (e.g., a data packet sent from a downstream device in a chain of peripheral devices, such as described in connection with FIGS. 1-3, to a host).

In the example illustrated in FIG. 4, the data packet 441 includes a header portion 443 that contains a token, a payload portion 445, and an error correction portion 447. As described above, the token can be one or more data bits or pattern of bits inserted into a downstream data packet and can be used to indicate to downstream devices (e.g., 320-1, 320-2, and 320-3 shown in FIG. 3) that an upstream device is ready to receive an upstream data packet. The data packet 441 can be a downstream data packet (e.g., a data packet sent from a host to one or more devices in a chain of devices that communicate with the host via a single host data input port and host data output port). Although in the example illustrated in FIG. 4, the header portion 443 contains the token, embodiments are not so limited. For instance, a token can be inserted in other locations within packet 441.

As discussed above, one or more embodiments include sending a data packet containing a token (e.g., data packet 441) from a first device to a second device in a chain of devices only if the first device is ready to receive an upstream data packet. In various embodiments, the second device detects the token and determines whether to send an upstream data packet (e.g., 440) to the first device or to send the data packet containing the token (441) to a third device in the chain.

As described herein above, embodiments of the present disclosure can control and arbitrate priority of data flow among chained devices in communication with the same interface port of a host device, for example. Embodiments can ensure well-regulated upstream data flow which can provide various benefits such as avoiding collisions and logjams while ensuring suitable bandwidth allocation to upstream data flow throughout the chain.

Conclusion

The present disclosure includes methods, devices, and systems for device to device flow control. In one or more embodiments, a system configured for device to device flow control includes a host and a chain of devices, including one or more memory device, coupled to each other and configured to communicate with the host device through a same host port. In one or more embodiments, at least one device in the chain is configured to regulate the flow of data by sending a token in downstream data packets, the token allowing devices downstream from the respective at least one device to send an upstream data packet to the respective at least one device.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure.

It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for device to device flow control, the method comprising:
   receiving a tokenless downstream data packet destined for a target device downstream from a device; and
   inserting a token into the tokenless downstream data packet as the packet is routed through the device, the token allowing devices downstream from the device to send an upstream data packet to the device.

2. The method of claim 1, including providing, with the token, an indication to one or more devices downstream from the device that the device is ready to receive the upstream data packet.

3. The method of claim 1, including consuming the token of a particular downstream data packet responsive to a device downstream from the device sending the upstream data packet.

4. The method of claim 1, including:
   generating a data packet containing the token; and
   sending the data packet downstream when the device is ready to receive the upstream data packet and there is an absence of downstream data traffic from a host to which the device is coupled.

5. The method of claim 1, wherein the device is in a chain of devices coupled to each other and configured to communicate with a host through a same host port, and wherein the method includes applying a data alternation rule that determines an amount of a total output bandwidth of the device allocated to upstream data from downstream devices of the chain.

6. The method of claim 5, wherein the data alternation rule includes allocating one half of the total output bandwidth of the device to upstream data from downstream devices of the chain.

7. The method of claim 1, including:
   staging received upstream data packets in an input buffer of the device; and
   staging data packets to be sent to a host in an output buffer of the device.

8. The method of claim 7, including filling the output buffer with received upstream data packets from the input buffer and locally generated data packets on an alternating basis.

9. A device comprising:
   control circuitry configured to:
      regulate flow of data in a chain of devices by sending a token in a downstream data packet, the token allowing devices downstream from the device to send an upstream data packet to the device;
      receive at least one tokenless downstream data packet destined for a target device in the chain; and
      insert the token into the at least one tokenless downstream data packet as the packet is routed through the device.

10. The device of claim 9, wherein the chain of devices are coupled to each other and in communication with a host through a same data port.

11. The device of claim 9, wherein the device is a network device.

12. The device of claim 9, wherein the token allows devices downstream from the device to send an upstream data packet to the device only after receiving the token.

13. The device of claim 9, including an input buffer configured to stage data packets received from one or more downstream devices.

14. The device of claim 13, including an output buffer configured to stage data packets to be sent to an upstream device.

15. The device of claim 14, wherein the control circuitry is configured to fill the output buffer with received upstream data packets from the input buffer and locally generated data packets on an alternating basis.

16. A system for device to device flow control, the system comprising:
 a host; and
 a chain of devices coupled to each other and configured to communicate with the host through a same host port;
 wherein the system is configured to:
  send data packets from the host to a target device in the chain of devices, wherein one or more of the data packets includes a token; and
  allow at least one of a number of devices downstream from the target device to insert the token into a tokenless downstream data packet received from the target device as the data packet is routed therethrough.

17. The system of claim 16, wherein the system is configured to allow one or more devices downstream from the target device to send an upstream data packet only after receiving the token.

18. The system of claim 16, wherein the system is configured to allocate data packets within an output buffer of the target device between data packets generated locally by the target device and data packets received by an input buffer of the target device from one or more devices downstream from the target device.

19. The system of claim 16, wherein target device is a first device downstream from the host.

20. The system of claim 16, wherein the token is valid for transmission of only one upstream data packet by a device downstream from the target device to the target device.

* * * * *